US012625079B2

(12) United States Patent
Jacob et al.

(10) Patent No.: US 12,625,079 B2
(45) Date of Patent: May 12, 2026

(54) ADAPTIVE INFORMATION MINING INTERFEROMETRY APPARATUSES AND METHODS

(71) Applicant: PURDUE RESEARCH FOUNDATION, West Lafayette, IN (US)

(72) Inventors: Zubin Jacob, West Lafayette, IN (US); Hyunsoo Choi, West Lafayette, IN (US); Fanglin Bao, West Lafayette, IN (US); Adrian Ezequiel Rubio Lopez, Santiago (CL)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 35 days.

(21) Appl. No.: 18/508,835

(22) Filed: Nov. 14, 2023

(65) Prior Publication Data

US 2024/0159676 A1      May 16, 2024

Related U.S. Application Data

(60) Provisional application No. 63/383,691, filed on Nov. 14, 2022.

(51) Int. Cl.
*G01N 21/64* (2006.01)

(52) U.S. Cl.
CPC ............................... *G01N 21/6458* (2013.01)

(58) Field of Classification Search
CPC ............... G01N 21/45; G01N 21/6458; G01B 9/02027; G01B 9/02039
See application file for complete search history.

(56) References Cited

U.S. PATENT DOCUMENTS

| | | | |
|---|---|---|---|
| 9,535,247 B2 * | 1/2017 | Tao | G01N 21/6428 |
| 12,092,456 B2 * | 9/2024 | Kim | G01B 9/02039 |
| 2014/0361150 A1 * | 12/2014 | Cheng | G01J 3/2803 250/214 A |

* cited by examiner

*Primary Examiner* — Kevin K Pyo

(57) ABSTRACT

Imaging systems and methods are disclosed for detecting objects in low photon environments. Embodiments modulate separate groups of photons from the same source, modulate the wavefronts of the separate groups of photons, recombine the modulated photons, utilize information of the recombined photons (such as by utilizing pre-trained reinforcement learning networks and/or by using the Fisher information), and iteratively adjust the manner in which the wavefronts are modulated to detect objects in the sub-Rayleigh region, and in dim regions with a small number of photons, for example, on the order of 10,000 per second or less. Further embodiments determine the iterative modulation patterns utilizing pre-trained reinforcement learning networks.

19 Claims, 9 Drawing Sheets

ADAPTIVE INFORMATION MINING INTERFEROMETRY APPARATUSES AND METHODS

This application claims the benefit of U.S. Provisional Application No. 63/383,691, filed 14 Nov. 2022, the entirety of which is hereby incorporated herein by reference.

GOVERNMENT RIGHTS

This invention was made with government support under HR00112090124 awarded by the Defense Advanced Research Projects Agency (DARPA). The government has certain rights in the invention.

FIELD

Embodiments of this disclosure relate generally to object detection in low photon environments, for example, detection of space objects.

BACKGROUND

The ability for imaging systems to differentiate between two or more objects has received increased attention for, for example, tracking orbital debris and detecting asteroids that could pose a collision risk with Earth. The field of tracking these types of objects is commonly referred to as Space Situational Awareness (SSA) or Space Domain Awareness (SDA).

However, it was realized by the inventors of the current disclosure that problems exist with current imaging system and that improvements are needed. For example, Current imaging systems (for example, AO systems) used for SSA/SDA can include Shack Hartman Wavefront Sensors (SHWFS) and deformable mirrors (DM) to correct for atmospheric turbulence. However, these systems do not work in the shot noise limited regime. It was also realized by the inventors of the present disclosure that the algorithms and hardware of existing systems are optimized for classical light intensity as opposed to information contained in the photons themselves.

It was realized by the inventors of the current disclosure that improvements in object detection are needed. For example, it was realized that improvements in object detection in low photon environments are needed.

Certain preferred features of the present disclosure address these and other needs and provide other important advantages.

SUMMARY

Embodiments of the present disclosure provide an improved adaptive information mining interferometry apparatuses and methods.

Embodiments of the present disclosure include a quantum-inspired imaging system which provides dramatically improved resolution (10x) for objects within a sub-Rayleigh region. Embodiments operate in the shot-noise limited regime of low photon number (i.e., low signal to noise ratio (SNR)) where the quantum advantage can exist over existing classical imaging systems. The measurement approach of example embodiments extracts optimal information from every single photon entering, for example, a telescope aperture as opposed to conventional direct imaging which only measures intensity in a fixed Fourier basis. Specific uses for various embodiments include space debris detection and characterization as well as interstellar/solar system object characterization.

Embodiments of the present disclosure do not require assumptions of equal brightness, known number of sources or known centroid. Embodiments adaptively update the modes for measurement for every approximate 100 photons based on the measurement results of previous approximate 100 photons. In some embodiments, the modes are determined using reinforcement learning, while in other embodiments the modes are determined using information metrics, such as Fisher information metrics. The initialization for the first approximate 100 photons can be performed in a fixed Zernike mode basis, which can help exploit the circular aperture symmetry. Optimal measurement modes can reduce the uncertainty in estimating the scene parameters and can be determined by iteratively solving for modes that optimize the chosen metrics. Example metrics include but are not limited to reinforcement learning rewards, the Fisher information, and the image sharpness. In some embodiments the optimal measurement modes are decided by iteratively using a pre-trained reinforcement learning network, and in some embodiments the optimal measurement modes are decided by iteratively solving for the eigenmodes of the quantum Fisher information matrix.

Embodiments of the present disclosure utilize an adaptive architecture which performs high efficiency, high speed real-time modal modulation at the single turbulent photon level.

Embodiments of the present disclosure provide an improved adaptive information mining interferometry apparatuses and methods. Embodiments provide improved adaptive information mining interferometry utilizing pre-trained reinforcement learning networks. Further example embodiments provide improved adaptive information mining Fisher interferometry apparatuses and methods.

Embodiments of the present disclosure provide apparatuses and systems for imaging that overcomes the Rayleigh limit.

Further embodiments provide apparatuses and systems for imaging at low photon numbers.

Still further embodiments provide apparatuses and systems for imaging faint sources, for example, dim objects.

Additional embodiments provide apparatuses and systems for adaptive imaging.

Yet additional embodiments provide apparatuses and systems for iteratively extracting optimal information from photons.

Yet further embodiments provide imaging apparatuses and methods that combine principles of quantum information theory and single photon turbulence.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
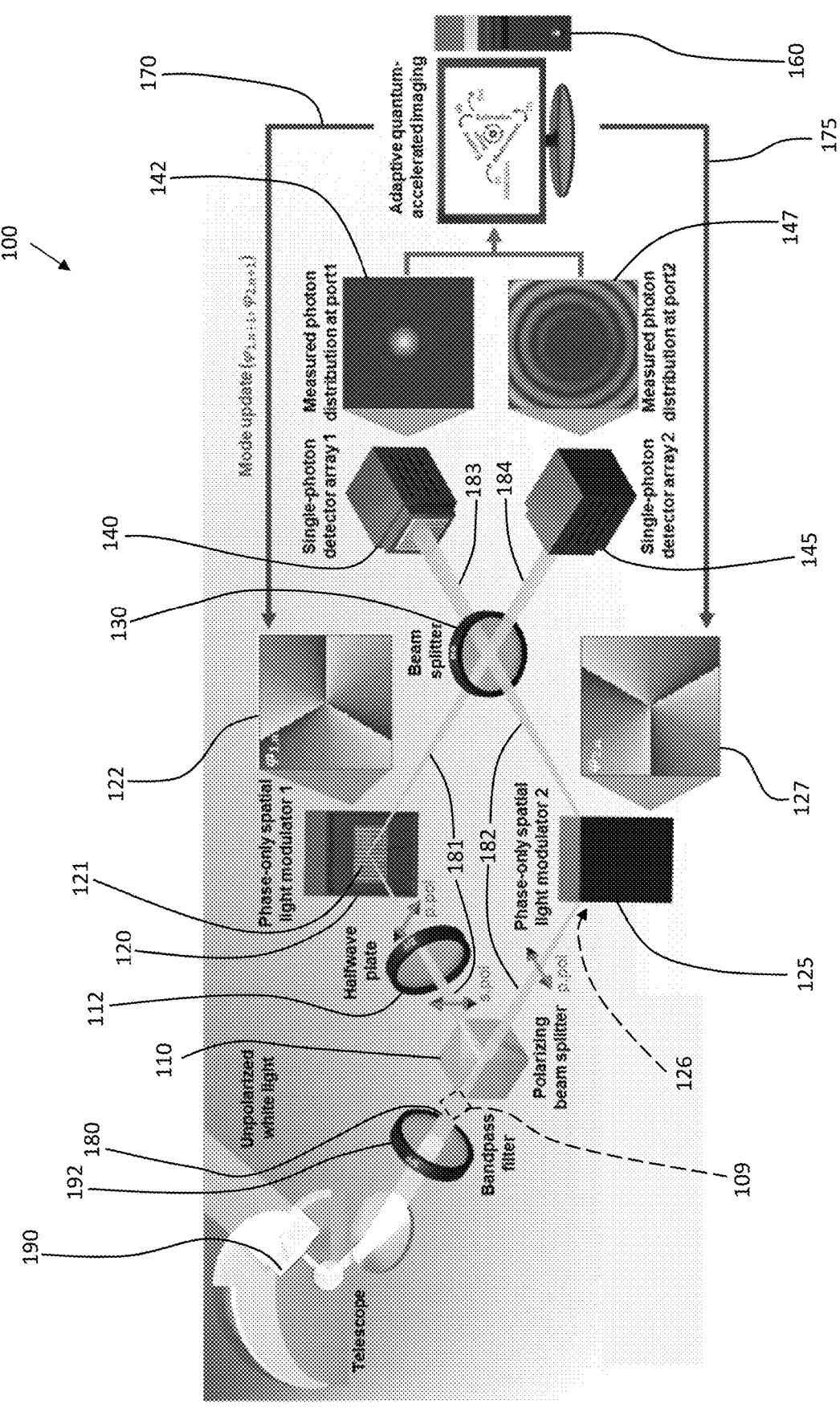
FIG. 1 is a schematic representation of an object detection system according to an embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Light to be analyzed is captured, such as by a telescope 190, and enters the object detection system 100 along an initial light pathway 180. An optical device, for example a bandpass filter 192, may optionally be positioned to manipulate the light before the light enters system 100.

Figure 2:
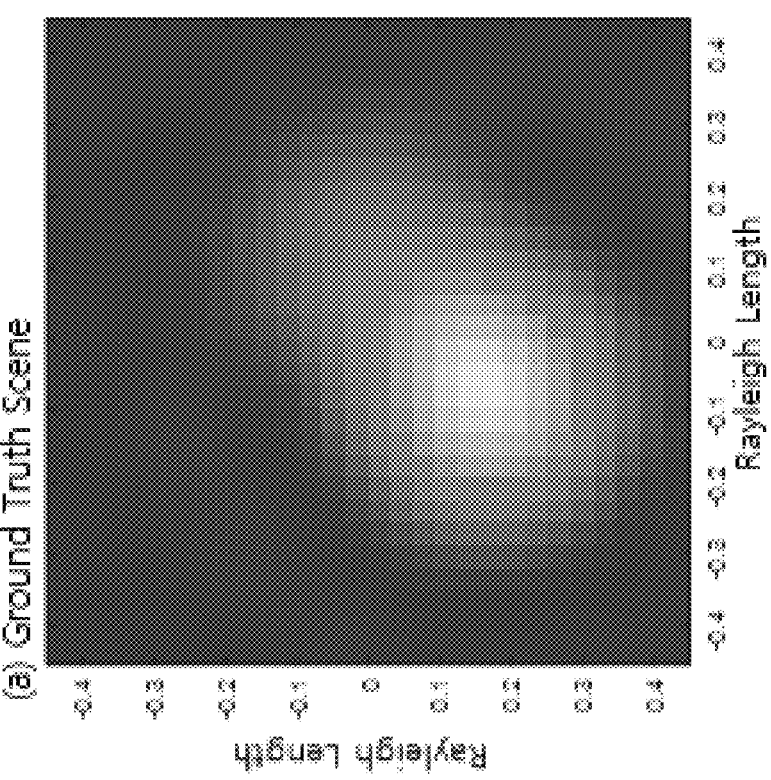
FIG. 2 is an example representation of an image produced by light entering the system depicted in FIG. 1 according to an embodiment of the present disclosure.

In one example, the light entering system 100 is light from two or more objects that are separated by a distance that is less than the Rayleigh criterion, also known as objects being within a sub-Rayleigh region. When objects are in the sub-Rayleigh region, the distance separating them is sufficiently small to make it difficult to distinguish the objects using traditional resolution methods. It is difficult to determine the locations of two or more objects in the sub-Rayleigh region, or even to obtain an accurate count of the number of objects in the sub-Rayleigh region. For example, two stars or two satellites may be so close together when observed, such as when using a telescope, that they are difficult to resolve and may, for example, appear as a single somewhat elongated light source. See, for example, FIG. 2, depicting a ground truth scene of how two light sources in the sub-Rayleigh region can appear using traditional resolution methods.

Upon entering system 100 the light is separated into two groupings, such as by being divided into two pathways (for example, pathway 181 and pathway 182). In one example a beam splitter (for example, polarizing beam splitter 110) is used to separate the initial light pathway 180 into at least a first light pathway 181 and a second light pathway 182. Some of the photons from the initial light beam travel along the first pathway 181 until being manipulated, such as by a spatial light modulator (for example, a phase-only spatial light modulator 120). Some of the photons from the initial light beam travel along the second pathway 182 until being manipulated, such as by a mirror or by a second spatial light modulator (for example, a phase-only spatial light modulator 125).

The one or more light modulators (for example, phase-only spatial light modulators 120 and 125) are capable of changing the phase of the light such that the light emerging from the one or more light modulators can have a varied phase pattern across the cross sectional area of the light beam. For example, the light modulator 120 and/or 125 can be a reflective type of light modulator comprised of an array of reflective locations each of which is capable of reflecting the light like a standard mirror. However, each of the individual reflective locations can also change the manner in which the light is reflected, such as by changing the phase of the light being reflected by that location. When all of the locations change the phase in the same manner, the light modulator affects the light similar to a standard mirror. In this way it is possible to configure embodiments with two light modulators to act as if there is one light modulator and one mirror. However, when different locations on the light modulator reflect the light at different phases, the light emerging from the light modulator will have varied regions and levels of constructive and destructive interference. Moreover, while some embodiments utilize a transmissive type of light modulator, which may also include one or more additional mirrors to cross the different light pathways, the transmissive type light modulator can result in some photons not emerging from the light modulator along the desired pathway, such as due to scattering or similar effects inherent in transmissive light modulators, thereby decreasing the number of photons available for detection by detector 140 and/or 145.

Figure 3:
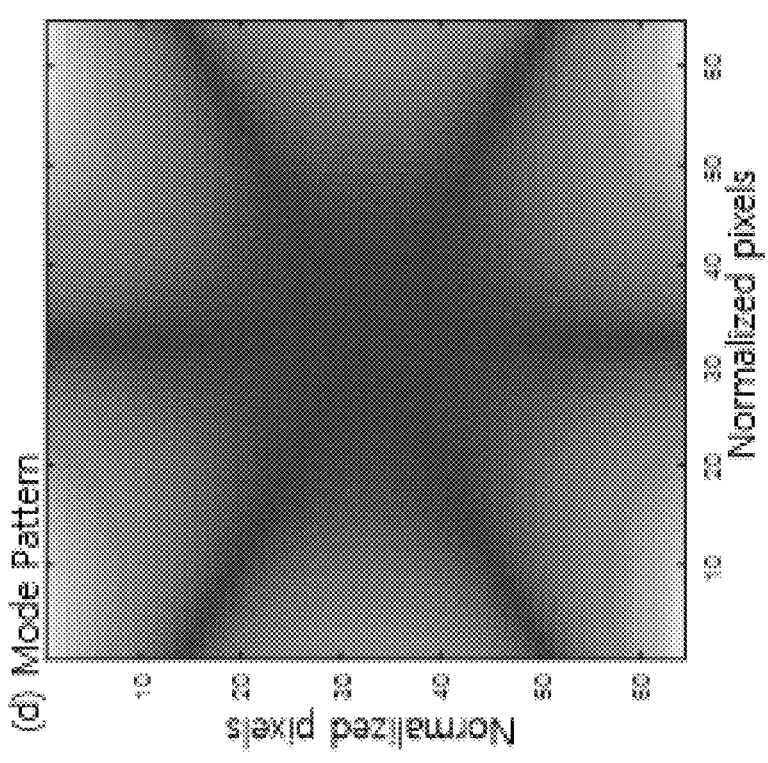
FIG. 3 is an example representation of a mode pattern used to generate phase patterns for the light modulators in the system depicted in FIG. 1 according to an embodiments of the present disclosure.
Figures 4, 5:
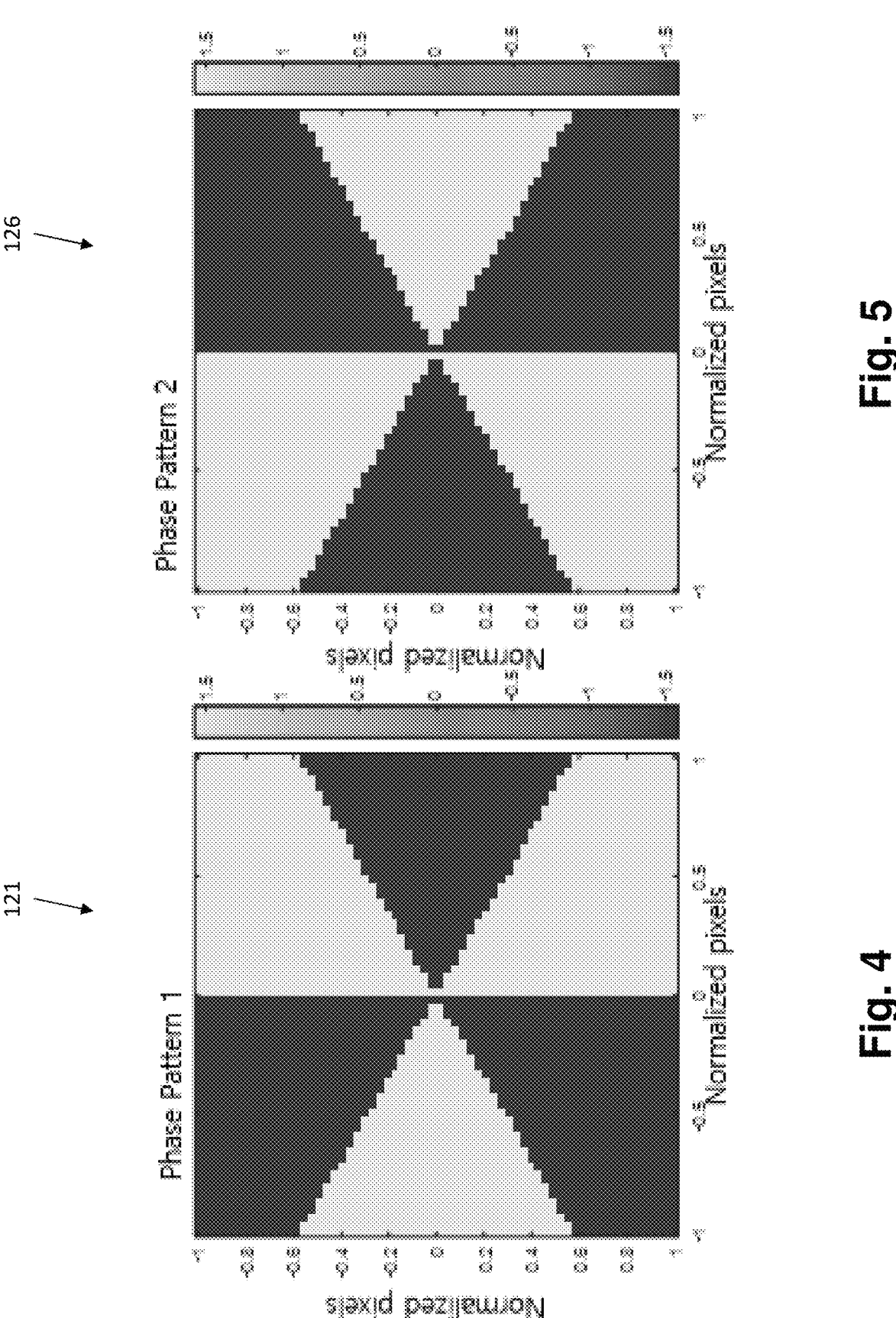
FIG. 4 is an example representation of a phase pattern for one of the light modulators depicted in FIG. 1 produced utilizing the mode pattern depicted in FIG. 3 according to an embodiments of the present disclosure.
FIG. 5 is an example representation of another phase pattern for another one of the light modulators depicted in FIG. 1 produced utilizing the mode pattern depicted in FIG. 3 according to an embodiments of the present disclosure.

The one or more modulation patterns initially used by the one or more light modulators (for example, light modulators 120 and 125), such as phase modulation patterns 121 and 126, are determined at the beginning of the manipulation of light entering system 100. For example, a mode pattern (one example of which is shown in FIG. 3, which depicts the mode pattern 115 for a single photon mode transformation from Fisher information theory achieved at the beam-splitter 130) can be used to construct and/or resolve the modulation patterns 121 and 126 (examples of which are the example phase patterns in the two SLM modulators 120 and 125 depicted in FIGS. 4 and 5, respectively) used by light modulators 120 and 125, respectively, as the light to be analyzed enters system 100. Other example mode patterns include those obtained by pre-trained reinforcement learning networks.

In some embodiments of the present disclosure the modulation patterns following the initial measurement are determined by, for example, a pre-trained reinforcement learning network and the current measurement. Utilizing this pre-trained network, denoted as $\pi$, and the current measured state, denoted as $s_t$, the subsequent action, $a_t$, is defined as $a_t=\pi(s_t)$. In this context, the subscript 't' denotes the timestep. The term "pre-trained network" refers to a network that has undergone prior training to address specific problems. Example cases include but are not limited to resolving multiple sources within sub-Rayleigh region in a low photon regime. The network processes inputs to generate outputs, with the output formulation influenced by the training. In this context, training involves utilizing datasets with known answers. The network is fed data and subsequently receives positive feedback if the output aligns closely with the answer, and conversely, negative feedback if the output significantly deviates from the answer.

The light emerging from the one or more modulators (for example, modulators 120 and 125) has a different wavefront pattern than the light entering the one or more modulators 120 and 125. For example, the changes imparted to the light being manipulated by the one or more modulators 120 and 125 can be represented as:

$$\text{Output field=input field*exp}(i{*}f)$$

where the output field is the field of the light emerging from the modulators, input field is the light entering the modulators, i is the imaginary number $\sqrt{-1}$, and f is the phase modulation that is desired to be input into the modulation pattern 121 for light modulator 120 and the modulation pattern 126 for light modulator 125. For example, in at least one embodiment the mode pattern 115 depicted in FIG. 3 can be set equal to m1, and the phase patterns 121 and 126 depicted in FIGS. 4 and 5 (here denoted at P1 and P2) are computed according to the following equations:

$$P1=\arccos(m1)+\text{phase angle }(m1), \text{ and}$$

$$P2=-\arccos(m1)+\text{phase angle }(m1).$$

Example depictions of the wavefronts emerging from light modulators 121 and 125 are represented by wavefront depictions 122 and 127.

After emerging from the one or more modulators (for example, modulators 120 and 125), the light beams traveling along light pathways 181 and 182 are combined. For example, in at least one embodiment a beam splitter 130 is used to combine the photons traveling in the two pathways 181 and 182. In embodiments represented by FIG. 1, the photons from the first pathway 181 are separated by the beam splitter 130 with some of the photons being directed along a third pathway 183 and some of the photons being directed along a fourth pathway 184, and the photons from the second pathway 182 are separated by the beam splitter 130 with some of the photons being directed along the third pathway 183 and some of the photons being directed along the fourth pathway 184. In these embodiments the third pathway 183 includes photons from both the first pathway 181 and the second pathway 182, and the fourth pathway 184 includes photons from both the first pathway 181 and the second pathway 182. Stated differently, each of the third (183) and fourth (184) pathways include a combination of the modulated light from the first (181) and second (182) pathways. In at least one embodiment, the light traveling along pathways 181 and 182 (referred to as two input beams $(I_{in,1}, I_{in,2})$) are manipulated by beam splitter 130 to interfere and be transmitted as:

$$\begin{pmatrix} I_{out,3} \\ I_{out,4} \end{pmatrix} = \frac{1}{\sqrt{2}} \begin{pmatrix} 1 & 1 \\ 1 & -1 \end{pmatrix} \begin{pmatrix} I_{out,3} \\ I_{out,4} \end{pmatrix}$$

where $I_{out,3}$ is the output light beam along the third pathway 183 and $I_{out,3}$ is the output light beam along the fourth pathway.

The combined light beam (photons) traveling along the third pathway 183 are received by a first detector 140, which measures the characteristics of the photons and outputs information representative of the measured characteristics. The combined light beam (photons) traveling along the fourth pathway 184 may be received by a second detector 145 (such as in embodiments where a second light modulator 125 is utilized instead of a mirror along pathway 182), which measures the characteristics of the photons and outputs information representative of the measured characteristics. For example, in at least one embodiment the detector 140 is a single-photon detector array that measures the distribution of photons received by the detector 140 and outputs information related to the measured photon distribution, and the optional detector 145 is a single-photon detector array that measures the distribution of photons received by the detector 145 and outputs information related to the measured photon distribution.

The information from the first detector 140 (and the information from the second detector 145 in embodiments utilizing a second detector 145 in lieu of a mirror) is used to determine information about the light traveling along pathway 183 (and 184). In at least one embodiment Fisher information is determined, which may be accomplished by calculating the Fisher information Matrix (FIM) $J_{ij}$ from measured images I, where:

$$J_{ij} = \sum_{\substack{all\ pixels\ in\ two\ images}} \frac{\left(\frac{dI}{di}\right) \cdot \left(\frac{dI}{dj}\right)}{I \cdot \left(\frac{I}{2} + 1\right)}$$

where I are measured images in unit of photon number, and i,j runs over all unknown variables such as position x, y, brightness b, and turbulence coefficients. In at least one additional embodiment modulation patterns following the initial measurement are determined by a pre-trained reinforcement learning network and the current measurement as described above.

The information is used to develop an updated mode pattern (see, for example, FIG. 3, which is an updated mode pattern developed from Fisher information), which is used to develop the phase patterns 121 and 126 (see, for example, FIGS. 1, 4 and 5) for the first light modulator 120 and one for the second light modulator 125, respectively, which are typically different from one another. In at least one example embodiment the mode pattern f' is determined from J by having a set of candidate mode patterns ($\phi_n$(x,y), n=1, 2, . . . , M), which are determined a priori, where M is the total number of candidate mode patterns. When utilizing $J_{ij}$ as given above, CRB (the % matrix inverse of the Fisher information Matrix (FIM) $J_{ij}$), metric (one example of the % trace) and f' (the mode pattern) can be calculated using $$CRB = 1/J_{ij}$$

$$metric\_k = trace(CRB)$$

$$k = argmin\ k(metric\_k);$$

$$f' = \phi_k(x, y)$$

for any of A/D/E-optimal design metric. In additional embodiments the information is used to develop an updated mode pattern using a pre-trained reinforcement learning network as described above Each of these updated phase patterns 121 and 123 are then transmitted to their respective light modulators 120 and 125, or in embodiments utilizing only one light modulator the updated phase pattern is transmitted to the single light modulator. Each of the light modulators uses its respective updated phase pattern to change how it modulates the light along each of pathways 181 and 182.

The process is iteratively repeated until the updated mode patterns f' in successive iterations are sufficiently similar, such as their differences being below a predetermined criterion.

The initial "mode patterns" that are used by the light modulators 120 and 125 on the first iteration are derived by using an initial estimate of an appropriate mode pattern.

As indicated above, wavefront patterns 122 and 127 are example depictions of the wavefront along pathways 181 and 182, respectively, after the light in each pathway 181 and 182 has been modulated by light modulators 120 and 125, respectively. Once the light modulators 120 and 125 receive revised modulation patterns, the modulation/phase patterns 122 and 127 will generally be different from what is depicted in FIG. 1.

Figures 6, 7:
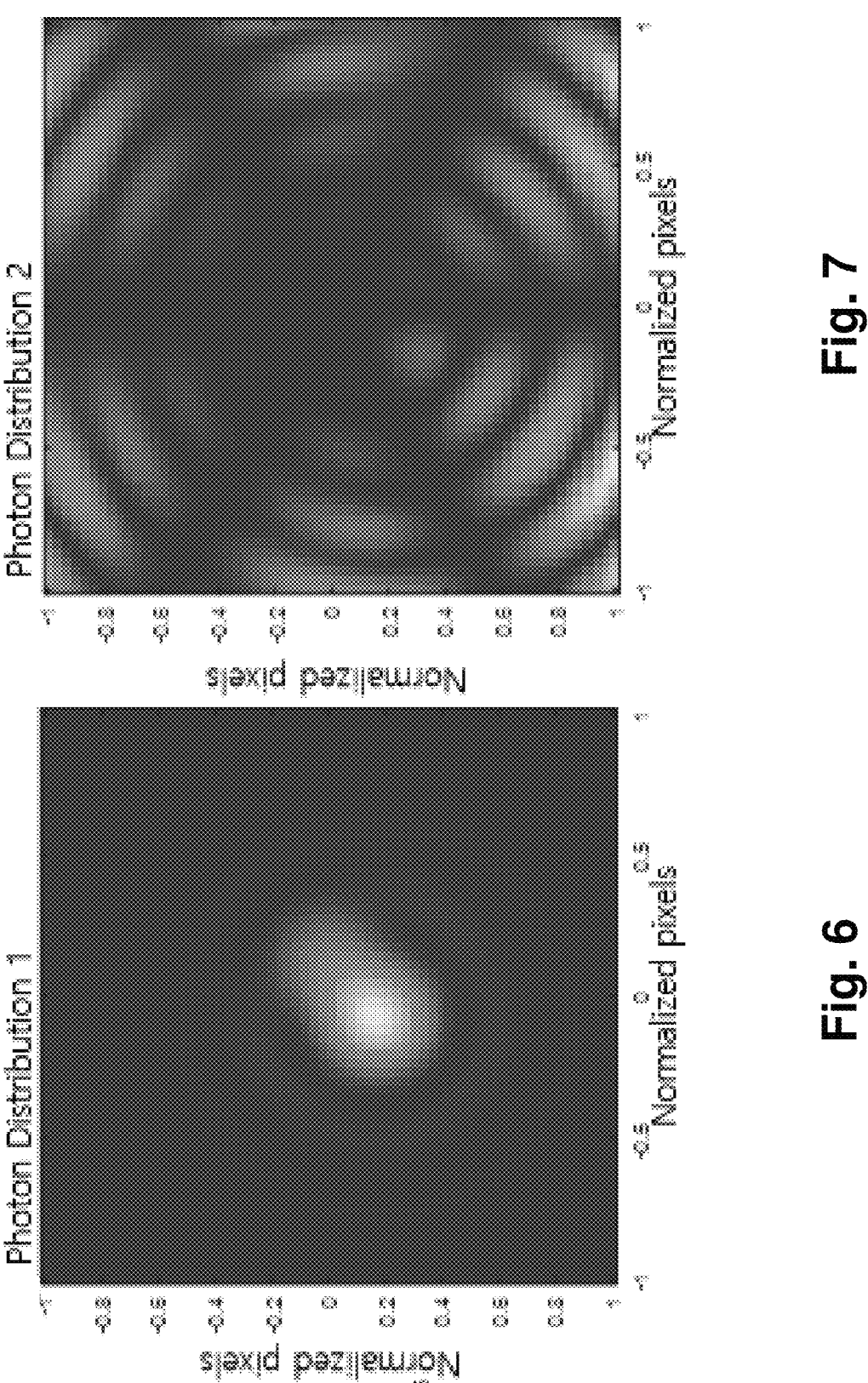
FIG. 6 is an example representation of the photon distribution image data detected by one of the detectors in the system depicted in FIG. 1 according to an embodiments of the present disclosure.
FIG. 7 is an example representation of the photon distribution image data detected by another one of the detectors in the system depicted in FIG. 1 according to an embodiments of the present disclosure.

Further embodiments include a beam splitter 109 (for example, a non-polarizing beam splitter) located upstream of the beam splitter 110 to create two pathways from light pathway 180 downstream of the filter 192. One pathway from the beam splitter 109 proceeds to the system 100 as depicted in FIG. 1, i.e., one pathway proceeds to the bream splitter 110, the one or more light modulators (for example, light modulators 120 and 125), the beam splitter 130 and the one or more detectors (for example, detectors 140 and 145). The other/second pathway from beam splitter 109 proceeds to another system, which is similar to system 100 and which may utilize different (or the same) initial conditions and iterate to a solution in a similar manner to the first system Depicted in FIGS. 6 and 7 are example measured photon distributions of the photons in pathways 183 and 184 as measured at detector arrays 140 and 145, respectively.

Figure 8:
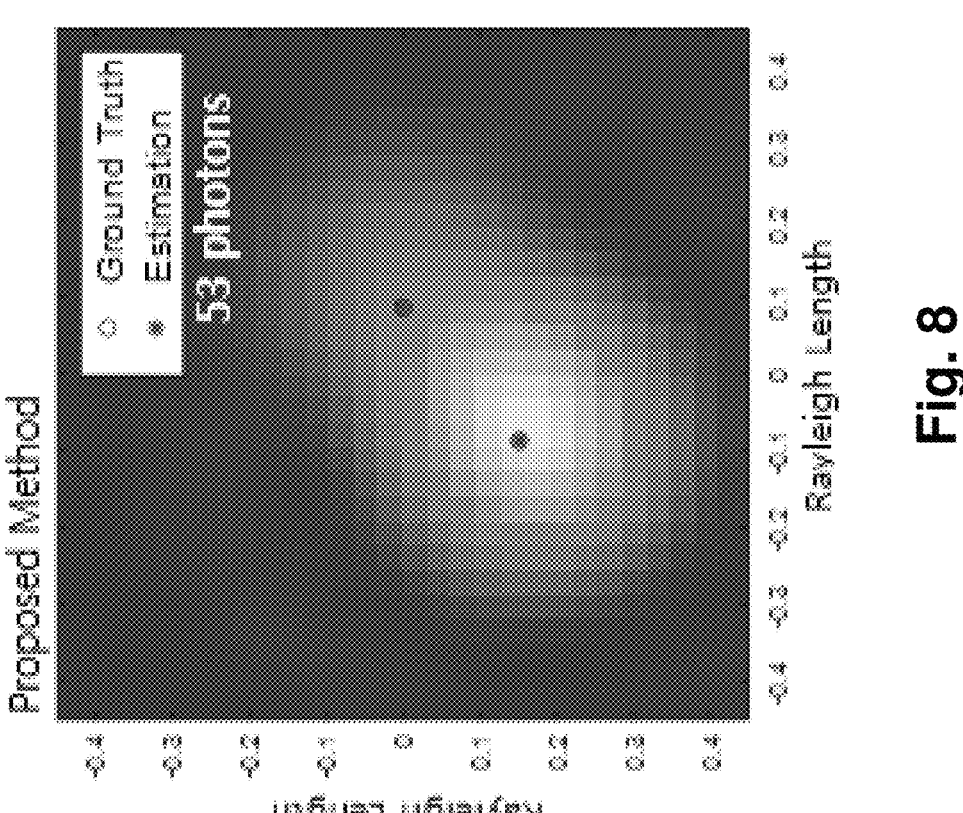
FIG. 8 is an example representation of the interpreted results in detecting the locations of the two light sources depicted in FIG. 2 using the system depicted in FIG. 1 according to an embodiments of the present disclosure

FIG. 8 is an example representation of the results in detecting locations of the two light sources depicted in FIG. 2 using at least one embodiments of the systems and methods depicted in FIG. 1. In FIG. 8 it can be see that the number of locations (2) estimated by embodiments utilizing system 100 (number of asterisks) equals the number of locations (2) in the truth data. Still further, it can be seen in FIG. 8 that the location data for the light sources estimated by embodiments utilizing system 100 (asterisks) coincides with the truth data for the location of the light sources (circles).

Figure 9:
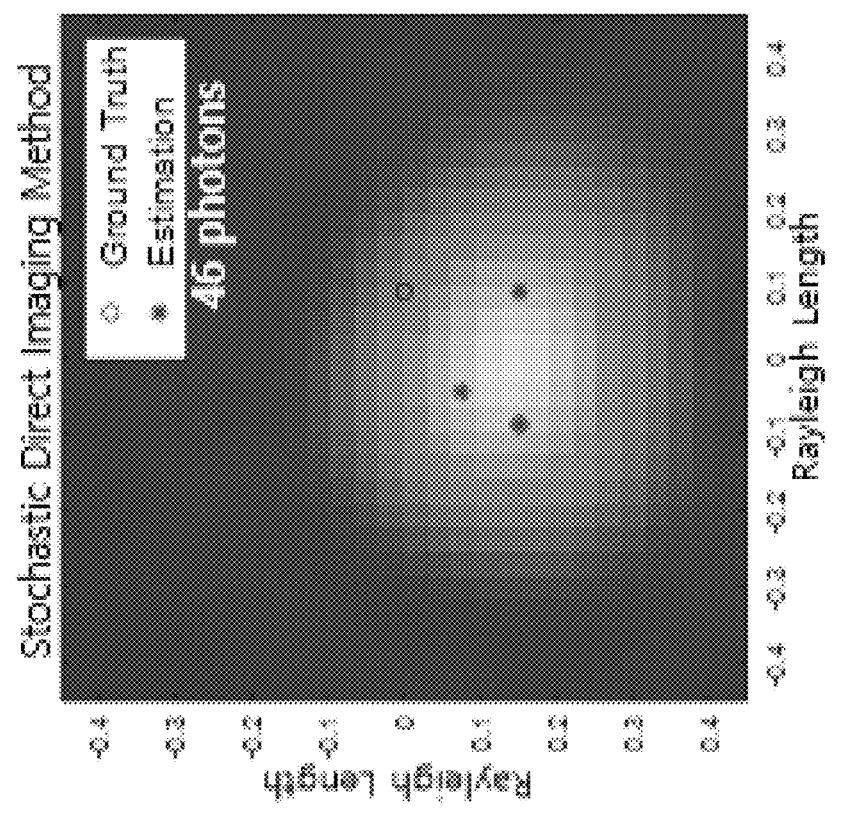
FIG. 9 is an example representation of the results in detecting the locations of the two light sources depicted in FIG. 2 using a conventional system.

FIG. 9 is an example representation of the results in detecting locations of the two light sources depicted in FIG. 2 using a conventional system/method. In FIG. 9 it can be see that the number of locations (3) estimated by conventional system/method (number of asterisks) does not equal the number of locations (2) in the truth data. Still further, it can also be seen in FIG. 9 that the location data for the light sources estimated by the conventional system/method (asterisks) coincides with only one of the locations in the truth data (circles), the other two estimated locations being far from the second location in the truth data.

Figure 10:
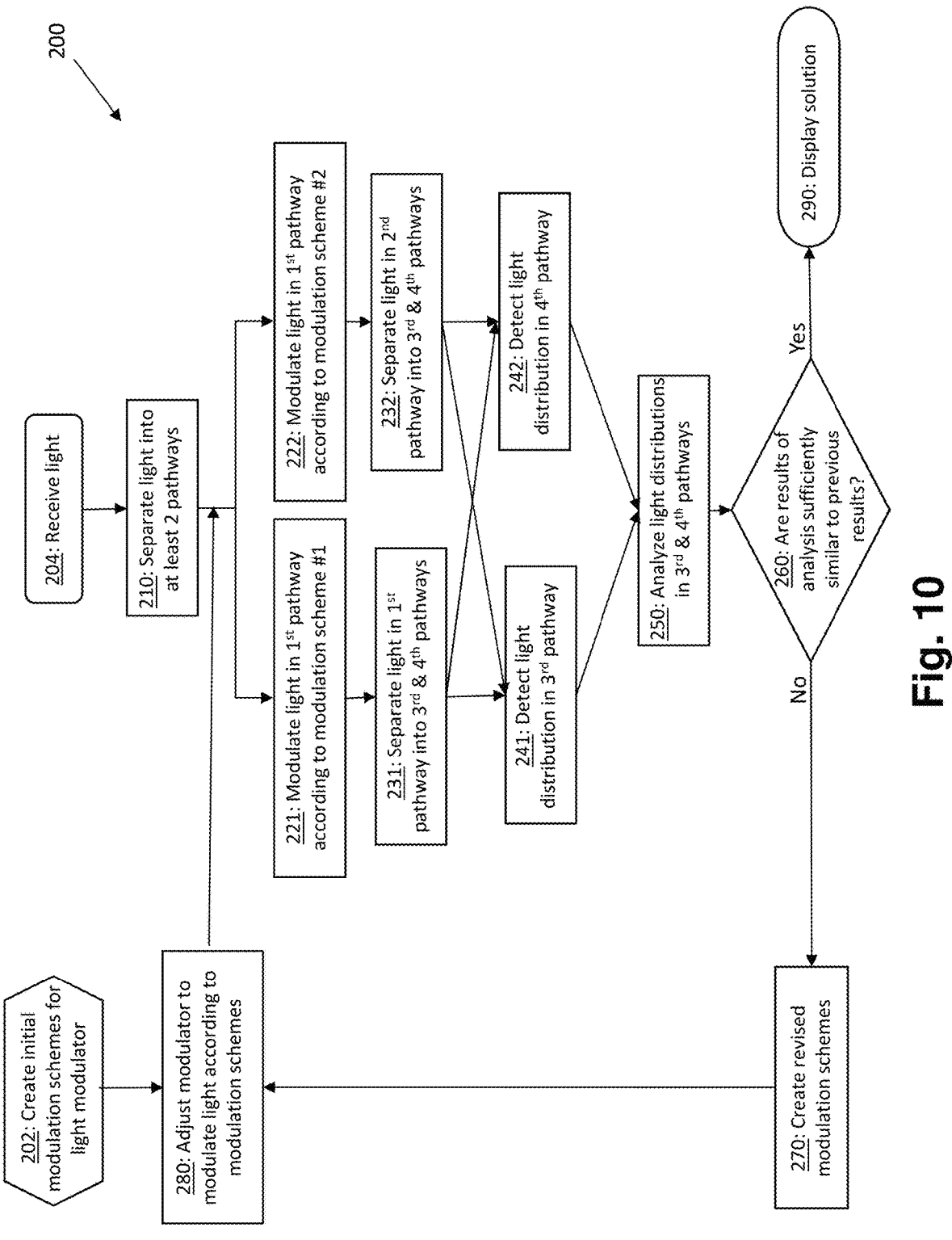
FIG. 10 is a flowchart example of a system or method for detecting objects according to a further embodiment of the present disclosure.
Figure 11:
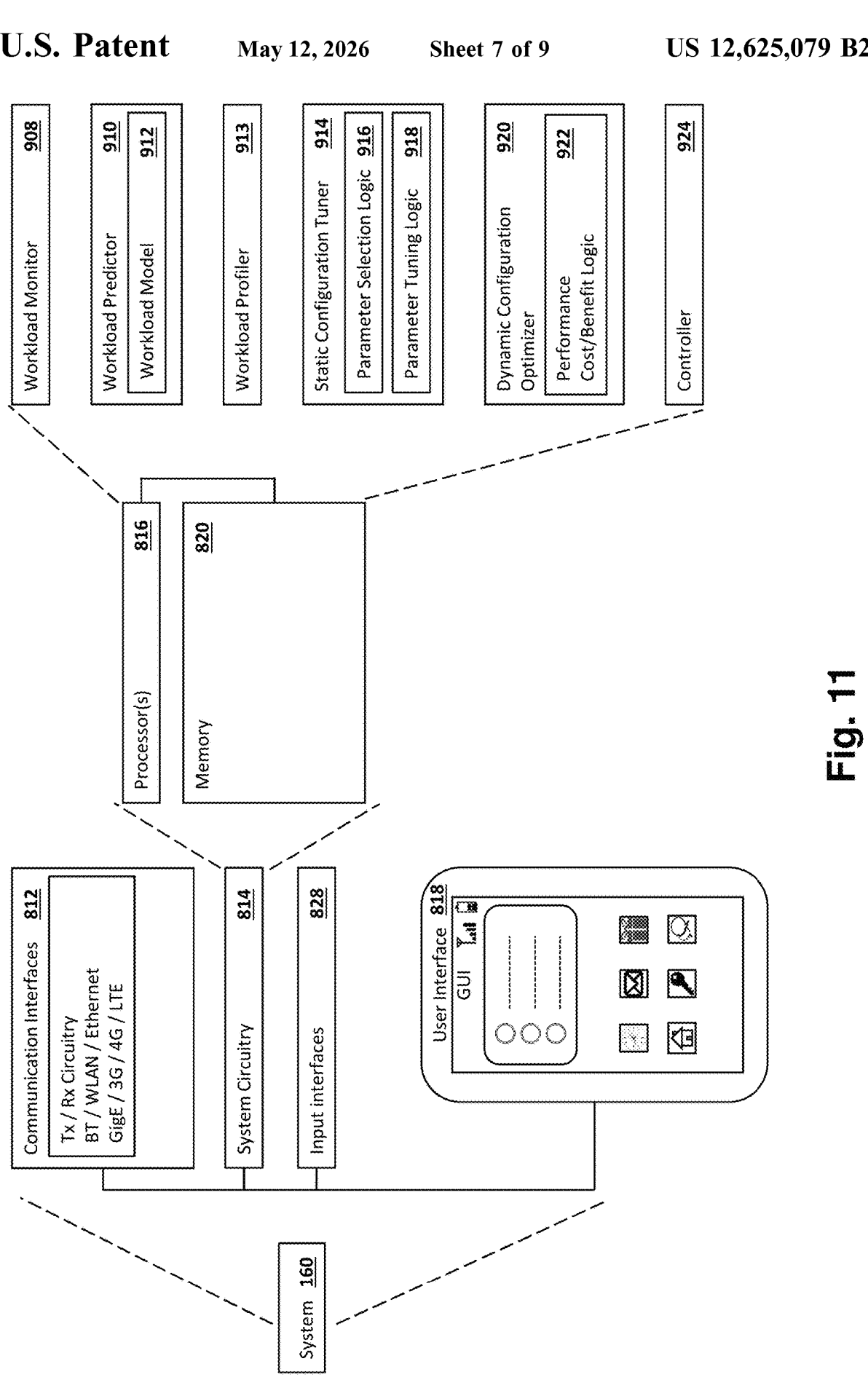
FIG. 11 is a diagrammatical view of a computational system according to one embodiment of the present disclosure.

Depicted in FIG. 10 is a flowchart example of a system or method for detecting objects according to a further embodiment of the present disclosure FIG. 11 illustrates a computational system 160 according to one embodiment of the present disclosure. The computational system 160 may include communication interfaces 812, input interfaces 828 and/or system circuitry 814. The system circuitry 814 may include one or more processors 816. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), a graphics processing unit (GPU), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the workload monitor 908, the workload predictor 910, the workload model 912, the workload profiler 913, the static configuration tuner 914, the perimeter selection logic 916, the parameter tuning logic 918, the dynamic configuration optimizer 920, the performance cost/benefit logic 922, and/or the controller 924. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the workload monitor 908, the workload predictor 910, the workload model 912, the workload profiler 913, the static configuration tuner 914, the perimeter selection logic 916, the parameter tuning logic 918, the dynamic configuration optimizer 920, the performance cost/benefit logic 922, and/or the controller 924. Alternatively or in addition, the memory may include any other component or subcomponent of the computational system 160 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the computational system 160 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The computational system 160 may be implemented in many ways. In some examples, the computational system 160 may be implemented with one or more logical components. For example, the logical components of the computational system 160 may be hardware or a combination of hardware and software. The logical components may include the workload monitor 908, the workload predictor 910, the workload model 912, the workload profiler 913, the static configuration tuner 914, the perimeter selection logic

916, the parameter tuning logic 918, the dynamic configuration optimizer 920, the performance cost/benefit logic 922, the computational system 160 and/or any component or subcomponent of the computational system 160. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

In at least one example embodiment represented by FIG. 2, a bandpass filter 192 is utilized to select a narrowband spectrum around, for example, 532 nm (nanometers). This wavelength can be selected and determined by the optimal efficiency of the detector arrays 140 and 145.

The polarizing beam splitter 110 splits the incoming photons into two pathways 181 and 182, which are reflected from two phase-only spatial light modulators 120 and 125, respectively. A phase only reflective LCOS SLM (with, for example, greater than 75% efficiency) can be used and no polarizers are placed in the in the path of the photons in order to maintain high photon efficiency in the system 100.

When the photons are combined on the beam-splitter 130, there is a simultaneous amplitude and phase modulation (mode transformation) for the photons. The mode complexity is set by the degrees of freedom in phase space, which can be greater than 106 for megapixel SLMs.

The recombined photons in pathway 183 are subsequently detected on detector array 140, and the recombined photons in pathway 184 are subsequently detected on detector array 145. Detector arrays 140 and 145 in this example are single photon detector arrays that image the entire photon distribution. The two SPAD arrays 140 and 145 help to enhance the system photon efficiency, which can reach above 25% and is a significant improvement over direct imaging systems.

Mode sorting or mode projections are not used in this example embodiment. Instead, single photon mode transformations/modulations are used to approximate the ideal quantum measurement. The pre-trained reinforcement learning network and/or the quantum Fisher information theory may also be used and modified to extract information from the detected photons. The photon distributions (mean, variance, arrival times) on each SPAD array 140 and 145 can be taken as input (such as input to the pre-trained reinforcement learning network and/or the quantum Fisher information theory algorithm) to update the SLMs at, for example, 1 KHz update rates, which approaches the fundamental limit of liquid crystal rise time in the modulators 120 and 125.

In some embodiments SLM modulators 120 and 125 are manufactured to have elevated operating temperatures to allow sub-millisecond liquid crystal (LC) response per pixel with high phase stability. The phase profiles of the SLM modulators 120 and 125 are solved for and the photon distributions are measured to iteratively update the phase profiles of the SLM modulators 120 and 125 for the next stream of incoming photons. Using these systems and methods, a 10× enhancement in resolution within the sub-Rayleigh regime can be achieved with the adaptive information mining interferometry system.

Figure 12:
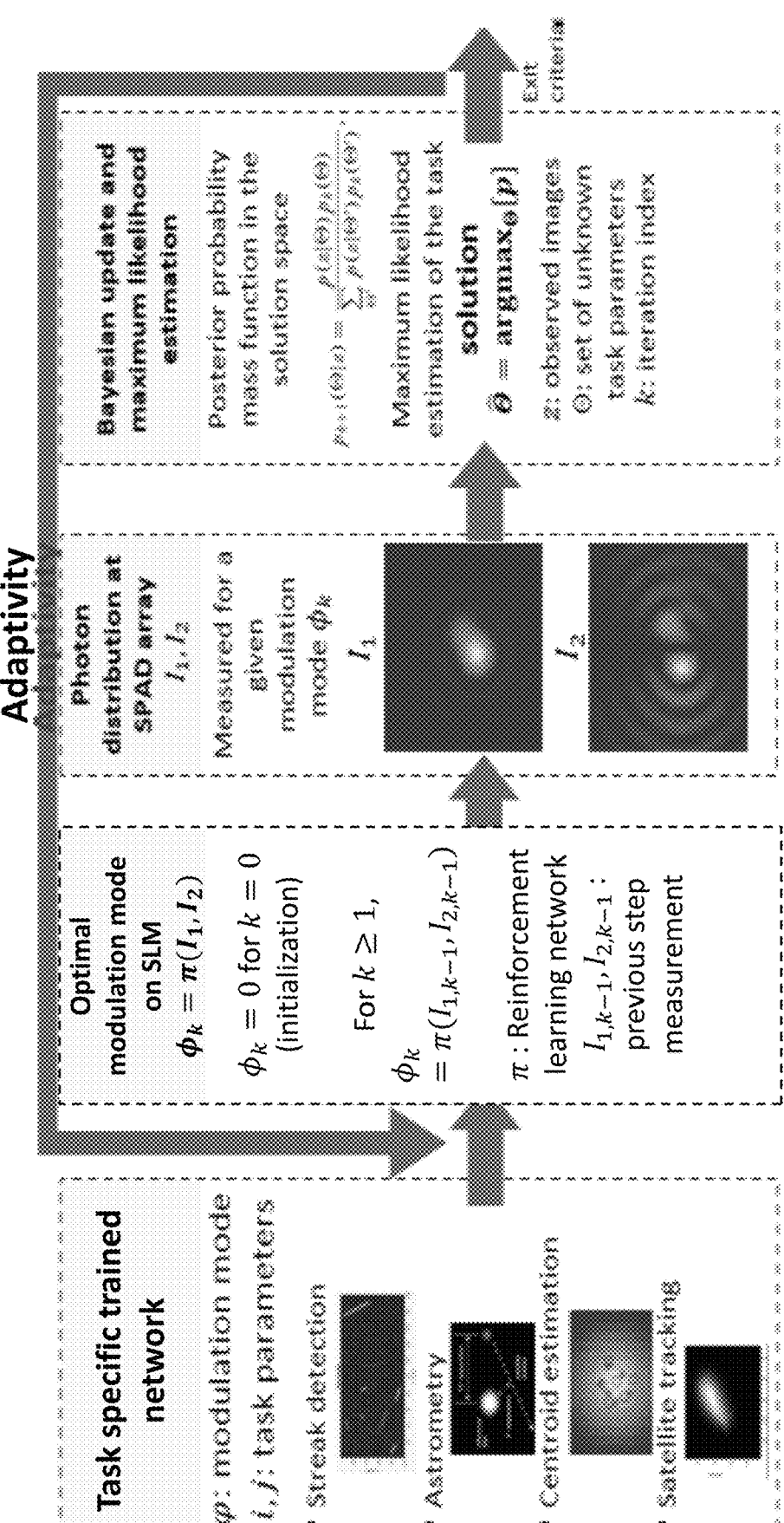
FIG. 12 depicts an example flowchart for the computational techniques used to arrive at the revised mode pattern and revised phase patterns according to at least one embodiment of the present disclosure.

FIG. 12 depicts an example flowchart for the computational techniques used to arrive at the revised mode pattern 115 and revised phase patterns 121 and 126 according to at least one embodiment of the present disclosure. Here, the flowchart depicts combining information theory (for example, quantum information theory), measured single photon distributions and the two SLMs in the adaptive architecture represented by system 100 according to at least one embodiment of the present disclosure. In this example flowchart, a reinforcement learning network is utilized.

Figure 13:
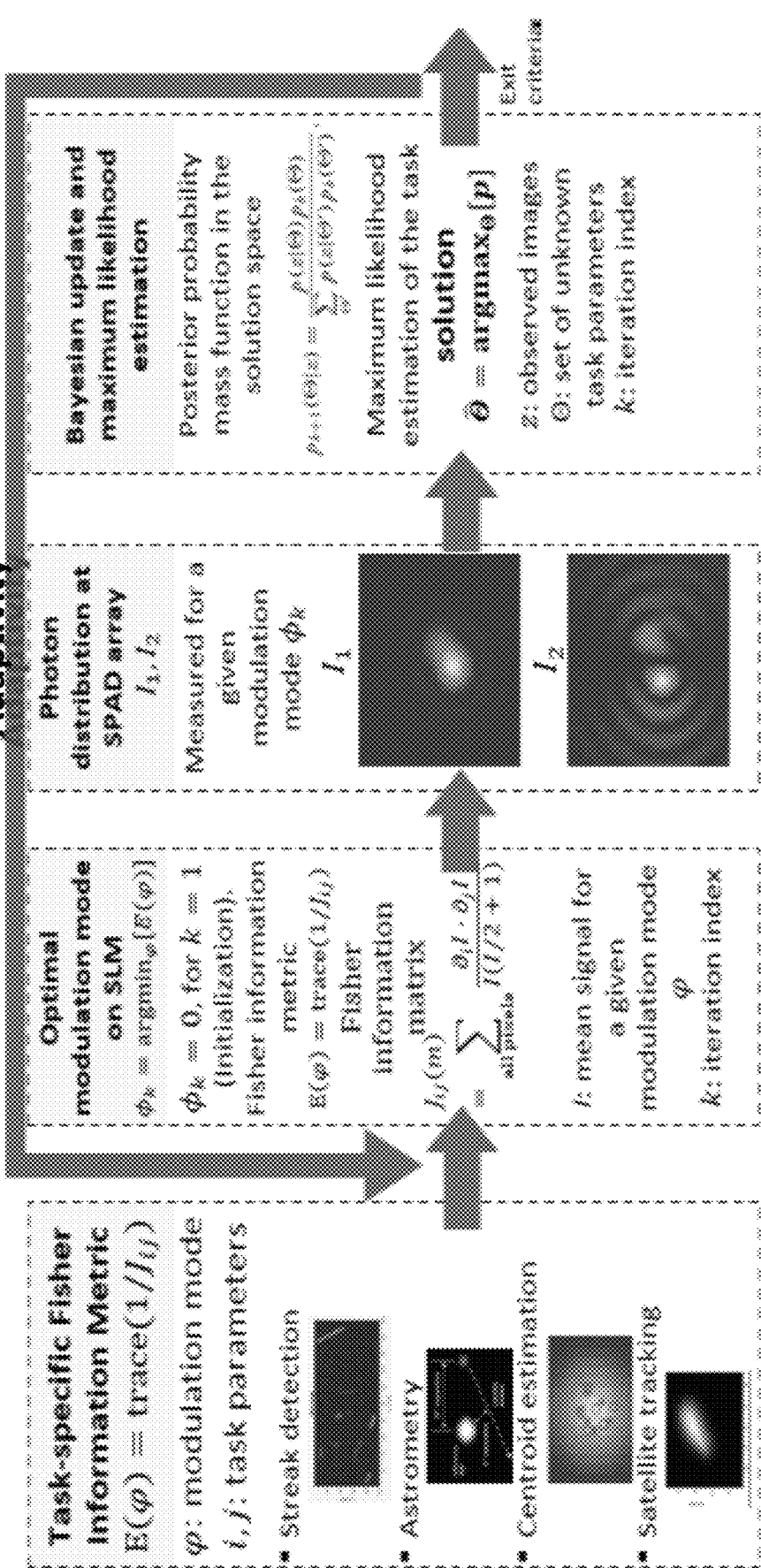
FIG. 13 depicts an example flowchart for the computational techniques used to arrive at the revised mode pattern and revised phase patterns according to at least one further embodiment of the present disclosure.

FIG. 13 depicts an example flowchart for the computational techniques used to arrive at the revised mode pattern 115 and revised phase patterns 121 and 126 according to at least one further embodiment of the present disclosure. Here, the flowchart depicts combining quantum information theory, measured single photon distributions and the two SLMs in the adaptive architecture represented by system 100 according to at least one further embodiment of the present disclosure. In this example flowchart, a Fisher information matrix is utilized.

Utilizing embodiments of the present disclosure, the accuracy in identifying the number of objects, the position accuracy and the brightness estimate within the sub-Rayleigh region has been found to be superior to prior systems and methods.

Still further embodiments incorporate Kolmogorov spectrum of atmospheric turbulence into the architecture of system 100. In these embodiments de-aberration modes are solved, which extracts optimal information from every single turbulent photon entering the aperture. These embodiments are capable of producing results for de-aberration modes that are a significant improvement for sub-Rayleigh resolution of point objects without the use of deformable mirrors or wavefront sensors.

Embodiments of the present disclosure are capable of operating at the shot noise limit in the presence of atmospheric turbulence and are compatible with active imaging techniques, which typically use coherent/structured light.

It is also possible to include embodiments of the present disclosure with conventional systems in the same hardware, such as in the same telescope. For example, a conventional AO system and a system according to the present disclosure can co-exist in a modular fashion within the same telescope.

Still further embodiments can be used with distributed apertures, such as by extending the disclosed modal transformation to single photons collected by different apertures. These embodiments can work at the shot noise limit utilizing quantum interference fundamentally different from conventional optical interferometric telescopes, which do not work with faint sources.

To clarify the use of and to hereby provide notice to the public, the phrases "at least one of A, B, . . . and N" or "at least one of A, B, . . . N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. As one example, "A, B and/or C" indicates that all of the following are contemplated: "A alone," "B alone," "C alone," "A and B together," "A and C together," "B and C together," and "A, B and C together." If the order of the items matters, then the term "and/or" combines items that can be taken separately or together in any order. For example, "A, B and/or C" indicates that all of the following are contemplated: "A alone," "B alone," "C alone," "A and B together," "B and A together," "A and C together," "C and A together," "B and C together," "C and B together," "A, B and C together," "A, C and B together," "B, A and C together," "B, C and A together," "C, A and B together," and "C, B and A together."

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

Reference systems that may be used herein can refer generally to various directions (e.g., upper, lower, forward, rearward, upstream and downstream), which are merely offered to assist the reader in understanding the various embodiments of the disclosure and are not to be interpreted as limiting.

Element Numbering

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 1

| | |
|---|---|
| 100 | Object detection system |
| 109 | Beam Splitter |
| 110 | Beam splitter |
| 112 | Halfwave plate (optional) |
| 115 | Mode pattern |
| 120 | Light modulator |
| 121 | Modulation pattern for light modulator 120 |
| 122 | Wavefront pattern (depiction of light wavefront traveling along pathway 181 after being modulated by modulator 120) |
| 125 | Light modulator |
| 126 | Modulation pattern for light modulator 125 |
| 127 | Wavefront pattern (depiction of light wavefront traveling along pathway 182 after being modulated by modulator 125 |
| 130 | Beam splitter |
| 140 | Detector |
| 142 | Photon distribution measured by detector 140 |
| 145 | Detector |
| 147 | Photon distribution measured by detector 145 |
| 160 | Computational system |
| 170 | Revised modulation pattern |
| 175 | Revised modulation pattern |
| 180 | Initial light pathway |
| 181 | First divided pathway |
| 182 | Second divided pathway |
| 183 | First combined pathway |
| 184 | Second combined pathway |
| 190 | Telescope |
| 192 | Filter |
| 812 | Communication interface(s) |
| 814 | System circuitry |
| 828 | Input interface(s) |
| 818 | User interface |
| 816 | Processor(s) |
| 820 | Memory |
| 908 | Workload monitor |
| 910 | Workload predictor |
| 912 | Workload model |
| 913 | Workload profiler |
| 914 | Static configuration tuner |
| 916 | Parameter selection logic |
| 918 | Parameter tuning logic |
| 920 | Dynamic configuration optimizer |
| 922 | Performance cost/benefit logic |
| 924 | Controller |

What is claimed is:

1. An apparatus, comprising:
a light separator configured to separate photons traveling in a single pathway into a first pathway and a second pathway;
a first spatial light modulator configured to modulate photons traveling along the first pathway;
a light combiner configured to
combine a first subset of photons traveling along the first pathway after being modulated by the first spatial light modulator with a first subset of photons traveling along the second pathway and direct these combined photons along a third pathway, and
combine a second subset of photons traveling along the first pathway after being modulated by the first spatial light modulator with a second subset of photons traveling along the second pathway and direct these combined photons along a fourth pathway;

a first photon detector configured to receive photons traveling along the third pathway and output a first signal representative of the distribution of photons traveling along the third pathway;

a second photon detector configured to receive photons traveling along the fourth pathway and output a second signal representative of the distribution of photons traveling along the fourth pathway; and one or more processors configured to receive the first signal representative of the distribution of photons traveling along the third pathway, receive the second signal representative of the distribution of photons traveling along the fourth pathway, generate a first command for the first spatial light modulator based on the first and second signals, and provide the first command to the first spatial light modulator, and wherein the first spatial light modulator is configured to modulate photons traveling along the first pathway according to the first command of the of the one or more processors.

2. The apparatus of claim 1, wherein the first command is generated based at least in part on a pre-trained reinforcement learning network that has undergone prior training to address resolution of multiple sources within the sub-Rayleigh region in a low photon regime.

3. The apparatus of claim 1, wherein the first command is generated based at least in part on Fisher information of the photons traveling along at least one of the third and fourth pathways.

4. The apparatus of claim 1, further comprising:

a second spatial light modulator configured to modulate photons traveling along the second pathway;

wherein the first subset of photons traveling along the second pathway being combined by the light combiner are a first subset of photons that are traveling along the second pathway after being modulated by the second spatial light modulator wherein the one or more processors are configured to generate a second command for the second spatial light modulator based on the first and second signals, and provide the second command to the first spatial light modulator; and wherein the second spatial light modulator is configured to modulate photons traveling along the second pathway according to the second command of the one or more processors.

5. The apparatus of claim 4, wherein at least one of the first and second commands are generated based at least in part on a pre-trained reinforcement learning network that has undergone prior training to address resolution of multiple sources within the sub-Rayleigh region in a low photon regime.

6. The apparatus of claim 4, wherein at least one of the first and second commands are generated based at least in part on Fisher information of the photons traveling along at least one of the third and fourth pathways.

7. A method, comprising:

separating light traveling in a single pathway into a first pathway and a second pathway, the light including photons;

modulating the photons traveling along the first pathway;

combining a first subset of photons traveling along the first pathway with a first subset of photons traveling along the second pathway and directing these combined photons along a third pathway;

combining a second subset of photons traveling along the first pathway with a second subset of photons traveling along the second pathway and directing these combined photons along a fourth pathway;

detecting photons traveling along the third pathway and outputting a first signal representative of the distribution of photons traveling along the third pathway;

detecting photons traveling along the fourth pathway and outputting a second signal representative of the distribution of photons traveling along the fourth pathway;

receiving the first signal representative of the distribution of photons traveling along the third pathway;

receiving the second signal representative of the distribution of photons traveling along the fourth pathway;

generating a first command based on the first and second signals; and modifying said modulating the photons traveling along the first pathway based on the first command.

8. The method of claim 7, wherein said generating a first command for the first spatial light modulator is based at least in part on a pre-trained reinforcement learning network that has undergone prior training to address resolution of multiple sources within the sub-Rayleigh region in a low photon regime.

9. The method of claim 7, wherein said generating a first command for the first spatial light modulator is based at least in part on Fisher information of the photons traveling along at least one of the third and fourth pathways.

10. The method of claim 7, further comprising:

modulating the photons traveling along the second pathway;

generating a second command based on the first and second signals; and modifying said modulating the photons traveling along the second pathway based on the second command.

11. The method of claim 10, wherein said generating a second command is based at least in part on a pre-trained reinforcement learning network that has undergone prior training to address resolution of multiple sources within the sub-Rayleigh region in a low photon regime.

12. The method of claim 10, wherein said generating a second command is based at least in part on Fisher information of the photons traveling along at least one of the third and fourth pathways.

13. An apparatus, comprising:

means for separating photons traveling in a single pathway into first and second pathways, modulating light traveling in at least one of the first and second pathways, and combining the first and second pathways into third and fourth pathways;

a first photon detector configured to receive photons traveling along the third pathway and output a first signal representative of the distribution of photons traveling along the third pathway;

a second photon detector configured to receive photons traveling along the fourth pathway and output a second signal representative of the distribution of photons traveling along the fourth pathway; and one or more processors configured to receive the first signal representative of the distribution of photons traveling along the third pathway, receive the second signal representative of the distribution of photons traveling along the fourth pathway, and generate a first command for the first spatial light modulator based on the first and second signals; and wherein said means for separating photons traveling in a single pathway into first and second pathways, modulating light traveling in at least one of the first and second pathways, and combining the first and second pathways into third and fourth pathways is modified based on the first command.

14. The apparatus of claim 13, wherein said means includes a light separator configured to separate photons traveling in the single pathway into the first pathway and the second pathway;

a first spatial light modulator configured to modulate photons traveling along the first pathway; and a light combiner configured to combine the first subset of photons traveling along the first pathway after being modulated by the first spatial light modulator with the first subset of photons traveling along the second pathway and direct these combined photons along the third pathway, and combine the second subset of photons traveling along the first pathway after being modulated by the first spatial light modulator with the second subset of photons traveling along the second pathway and direct these combined photons along the fourth pathway.

15. The apparatus of claim 14, wherein the first command is generated based at least in part on a pre-trained reinforcement learning network that has undergone prior training to address resolution of multiple sources within the sub-Rayleigh region in a low photon regime.

16. The apparatus of claim 14, wherein the first command is generated based at least in part on Fisher information of the photons traveling along at least one of the third and fourth pathways.

17. The apparatus of claim 14, wherein said means includes a second spatial light modulator configured to modulate photons traveling along the second pathway;

wherein the light combiner is configured to combine the first subset of photons traveling along the first pathway with a first subset of photons traveling along the second pathway after being modulated by the second spatial light modulator and direct these combined photons along the third pathway;

wherein the light combiner is configured to combine the second subset of photons traveling along the first pathway with a second subset of photons traveling along the second pathway after being modulated by the second spatial light modulator and direct these combined photons along the fourth pathway; and wherein the one or more processors are configured to generate a second command for the second spatial light modulator based on the first and second signals.

18. The apparatus of claim 17, wherein at least one of the first and second commands are generated based at least in part on a pre-trained reinforcement learning network that has undergone prior training to address resolution of multiple sources within the sub-Rayleigh region in a low photon regime.

19. The apparatus of claim 17, wherein at least one of the first and second commands are generated based at least in part on Fisher information of the photons traveling along at least one of the third and fourth pathways.

* * * * *